June 10, 1969  K. A. RHOADS  3,448,652
CYLINDRICAL SEGMENTED RETAINING PIN WITH INTERLOCKING SURFACES
Filed Dec. 6, 1967  Sheet 1 of 2
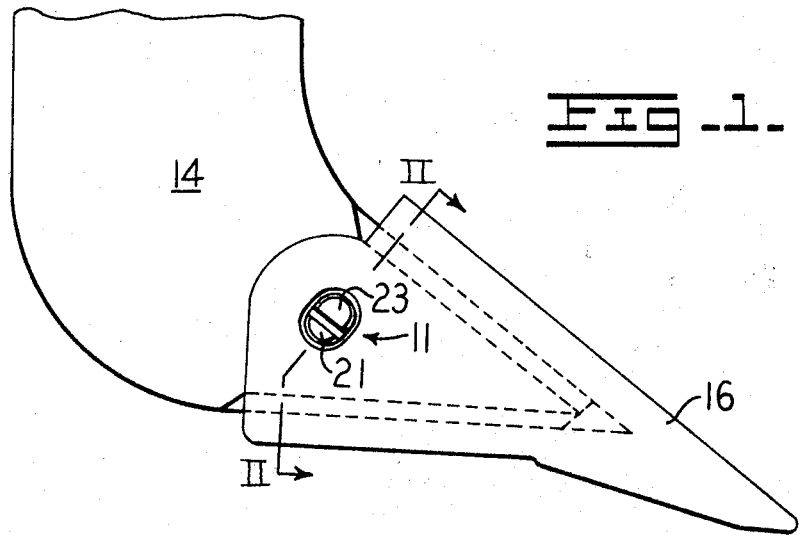
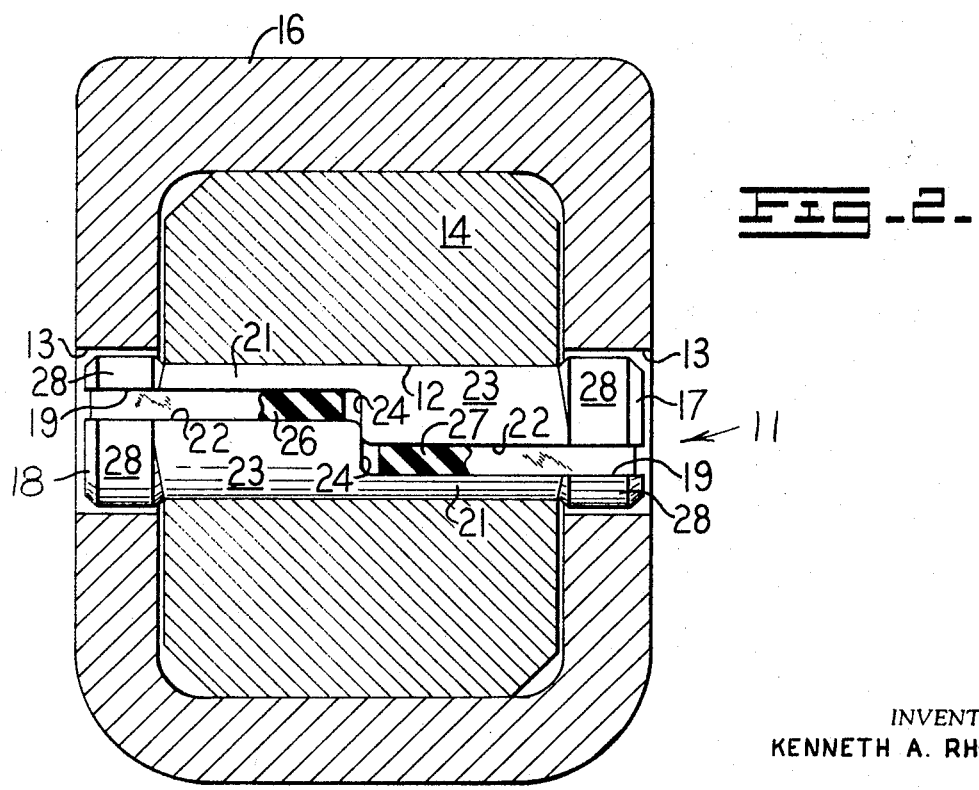
INVENTOR
KENNETH A. RHOADS
BY
ATTORNEYS

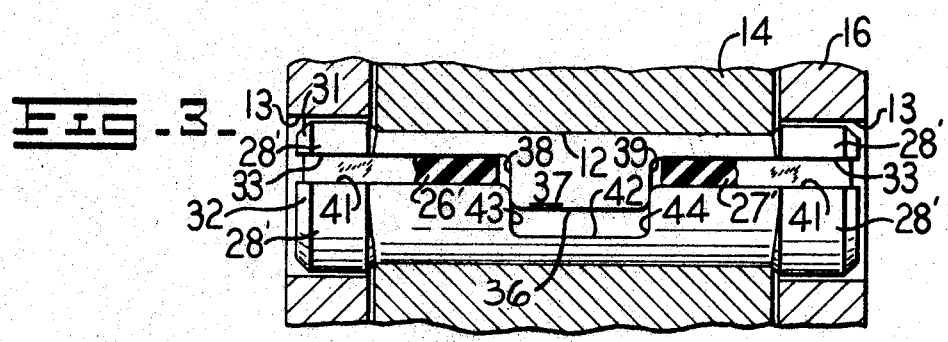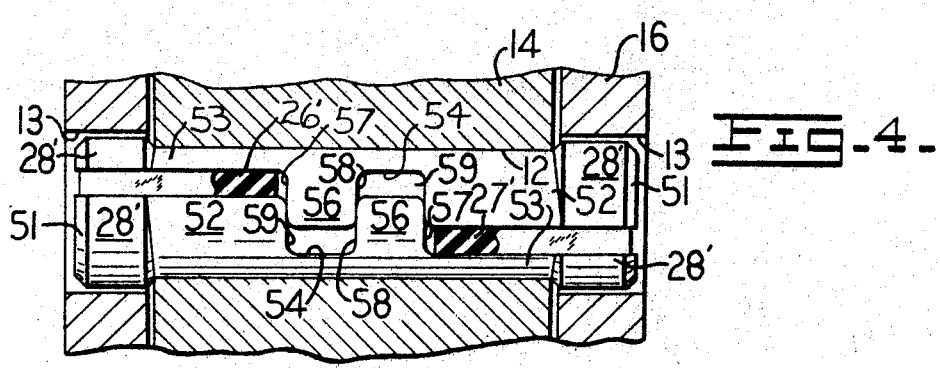

United States Patent Office 3,448,652
Patented June 10, 1969

3,448,652
CYLINDRICAL SEGMENTED RETAINING PIN WITH INTERLOCKING SURFACES
Kenneth A. Rhoads, Peoria, Ill., assignor to Caterpillar Tractor Co., Peoria, Ill., a corporation of California
Filed Dec. 6, 1967, Ser. No. 688,546
Int. Cl. F16b 19/00, 21/00; E02f 9/28
U.S. Cl. 85—8.3                                5 Claims

ABSTRACT OF THE DISCLOSURE

Three embodiments of a cylindrical retaining pin assembly for suitably securing a ripper tip on a shank where the shank has a bore and the tip has aligned bores at the ends of the shank bore. Two elongated semicylindical pin segments are separated by resilient spreader material at each end of the assembled pin segments. The pin segments define surfaces at midlength which are normal to the pin axis, the normal surfaces of the pin segments being in positive opposition in the assembled pin.

BACKGROUND OF THE INVENTION

The present invention relates to a retaining pin assembly for joining two parts which define generally coaxial bores. More particularly, the retaining pin is preferably employable for securing a shank which defines a central bore and another member which defines a coaxial and slightly larger bore at each end of the central bore in the shank. The retaining pin is preferably contemplated for use in earth moving machinery where the member is a ripper tip, for example.

In such applications, the ripper tip experiences substantial wear and it is desirable that the tip be rapidly and economically replaceable. Failure of the retaining pin must also be prevented since that material handled by the ripper tip or similar member is frequently processed in a rock-crusher or similar machine. Since the ripper tip is necessarily hardened to resist wear, its loss from the shank could result in a considerable loss of time and money should it pass through the rock crusher.

It is well known in the prior art to provide segmented retaining pins with resilient spreader material between the segments so that the pin may be readily inserted or removed. The resilient material urges the segments apart while the pin is in a suitable bore to prevent loss of the pin. However, in such retaining pins, the resilient member is normally bonded to at least one of the segments to insure that it is retained in the pin assembly. Uneven driving force exerted upon one of the pin segments to insert the pin assembly in a suitable bore may tend to shear the resilient material from the segments. Loss of the resilient material generally results in failure of the pin as well as preventing reuse of the pin.

The present invention overcomes the above problem by providing surfaces normal to the axis of each pin segment so that the normal surfaces are in opposing relation when the pin is assembled and a resilient spreader member is inserted between the pin segment on each end of the opposing surfaces. This feature also insures proper alignment of the pin segments in the assembled pin.

It is accordingly an object of the present invention to provide a retaining pin of the type described where its segments have positively opposing surfaces to prevent motion of each segment in at least one axial direction relative to the other segment within the pin assembly.

It is a further object to provide multiple opposing surfaces on the pin segments to prevent relative motion in either axial direction of the pin segment within the pin assembly to prevent shearing of the resilient material during pin installation or pin removal and to further insure against loss of the installed retaining pin.

Other objects and advantages will be made apparent from the following description and the accompanying drawings wherein:

FIG. 1 is a side elevation view of a ripper tip secured upon a shank by a retaining pin; and FIGS. 2, 3 and 4 are views taken along section lines II—II of FIG. 1 and illustrate alternate embodiments of the retaining pin.

Referring now to FIGS. 1 and 2, a retaining pin 11 is illustrated within a central bore 12 and end bores 13 formed respectively in a shank 14 and a ripper tip 16. The ripper tip 16 joins with the shank 14 in telescoping relation with the two members to be secured in a position where the slightly larger end bores 13 are in coaxial alignment with the central bore 12. The pin assembly comprises two elongated, semicylindrical segments 17 and 18 of generally equal lengths. Each pin segment has a chordal surface 19 at one end forming a chordal section 21 of thin dimension. The other end of each pin segment has a chordal surface 22 forming a chordal section 23 of relatively thick dimension. The surfaces 19 and 22 of each pin segment intersect generally at the center of the pin segment to form a surface 24 which is normal to the pin axis. Resilient spreader members 26 and 27 are inserted between the pin segments at each end of the assembled pin. Each pin segment has an enlarged part 28 at each end. When the pin is assembled and inserted through the central bore, the resilient members urge the pin segments apart so that they generally mate with the central bore 12 to prevent dirt and other foreign material from entering and interfering with the action of the pin. The enlarged parts on the pin segments act axially against the central member 14 and radially against the bore surfaces of the outer member to maintain the joint between the members and tend to resist axial motion of the pin segments and thus secure the pin in place. The dimensions of the two chordal sections of each pin segment are selected so that the normal surfaces 24 of the two pin segments are always in positive opposition when the pin is assembled in its bores.

Each of the resilient spreader members is bonded to an adjoining surface of at least one of the pin segments to prevent the resilient material from working its way out of the pin assembly to permit pin failure.

In prior art pin assemblies, relative motion of the pin segments was possible during insertion or removal of the pin assembly from the bores. Such relative axial motion tends to rupture or destroy the bond of the resilient material to the pin segment which could result in failure of the assembled pin or at least make reuse of the pin assembly difficult since it would not be readily possible to properly align the pin segments and resilient members. With the above construction, it is noted that force exerted rightwardly on the pin assembly would be received by the larger end of pin segment 18 while leftward force would tend to be received by the larger ends of pin segments 17. In either case, that force would be transmitted between the pin segments through their intersecting and positively opposing surfaces 24 so that the two pin segmnets would remain in alignment with no axial stress arising in the resilient member. The pin segments are also of symmetrical construction for economical production and reduction of the number of different parts in the pin assembly.

An alternate pin assembly is illustrated in FIG. 3 and comprises two pin segments 31 and 32 with similar shoulder means 28' and similar resilient member 26' and 27'. The chordal surfaces of the pin segments 31 and 32 are arranged to provide two pairs of opposing surfaces described below generally at the center of the pin to completely resist relative axial motion between the pin segment in either axial direction. The pin segment 31 has a chordal surface 33 at each end defining similar chordal sections of thin dimension and a centrally projecting chordal surface 36 forming a lug 37 with opposite axially normal surfaces 38 and 39. The other pin segment 32 has chordal surfaces 41 forming similar chordal section of thick dimension at each end of the pin segment. A notched surface 42 is defined at the midlength of the pin segment and has opposite axially normal surfaces 43 and 44. When the pin is assembled and within the parts to be joined, the two normal surface pairs 38, 43 and 39, 44 are always in positively opposing relation. By this arrangement, shearing force on the resilient members is prevented and alignment of the segments is insured regardless of the direction in which the pin is inserted or removed from its bores.

The retaining pin embodiment illustrated in FIG. 4 combines the multiple opposing surface feature of the embodiment in FIG. 3 together with the symmetrical relation of the pin segments as in the embodiment of FIG. 2. Each pin segment 51 has a chordal section 52 of thick dimension at one end and a chordal section 53 of thin dimension at the other end. The midlength portion of each pin segment defines a notch 54 adjacent its chordal section of thick dimension and a lug 56 between the notch and the chordal section of thin dimension. The intersections of the two chordal sections, the lug and the notch on each pin segment define three axially normal surfaces 57, 58 and 59. While the configuration of the two pin segments are symmetrical, their axially normal surfaces 57, 58 and 59 provide opposing surface pairs as with the embodiment in FIG. 3.

I claim:
1. A generally cylindrical retaining pin assembly for joining two parts, one part defining a bore and the other part defining end bores for coaxial alignment with the bore of the one part, the pin comprising two generally coextensive semi-cylindrical segments and an elastic member for arrangement between the two segments at each end of the assembled pin to urge the pin segments against at least one of the bores, each of the pin segments being formed of chordal sections of substantially different chordal dimension, the chordal sections joining generally at the midlength of the pin segments to form surfaces generally normal to the pin segment axes, the larger chordal sections of the pin segments being in diametrically overlapping relation when the pin assembly is inserted in the parts so that the normal surfaces of the two segments are in opposing and positively abutting relation each to the other within the pin assembly.

2. The combination of claim 1 wherein each elastic member is bonded to at least one adjacent pin segment surface in the pin assembly.

3. The combination of claim 1 wherein one of the pin segments has chordal sections defining axial pin segment ends of relatively thin dimension and another chordal section defining a lug at the axial center of the one pin segment, the other pin segment having chordal sections defining relatively thick axial pin segment ends and another chordal section defining a notch at the axial center of the other pin segment, the lug of the one pin segment facing and interlocking with the notch of the other pin segment in the pin assembly.

4. The combination of claim 1 wherein each pin segment has two chordal sections forming one axial pin segment end of relatively thin dimension and the other pin segment end of relatively thick dimension, the thin end of each pin segment being coextensively aligned with the thick end of the other pin segment in the pin assembly.

5. The combination of claim 4 wherein each pin segment has a notch and a lug generally at midlength, the notch being adjacent the thicker pin end and the lug interposed between the notch and thinner pin segment end, the notch and lug of each pin segment in facing and interlocking relation with the lug and notch respectively of the other pin segment in the pin assembly.

References Cited

UNITED STATES PATENTS

| | | | |
|---|---|---|---|
| 2,669,153 | 2/1954 | Launder | 85—8.3 |
| 2,798,403 | 7/1957 | Launder | 85—8.3 |
| 2,870,667 | 1/1959 | Murtaugh | 85—8.3 |
| 2,987,332 | 6/1961 | Bonmartini. | |
| 3,121,289 | 2/1964 | Eyolfson | 85—8.1 |

MARION PARSONS, Jr., *Primary Examiner.*

U.S. Cl. X.R.

37—142